United States Patent [19]
Swann

[11] 3,735,658
[45] May 29, 1973

[54] PLASTIC CUTTING APPARATUS
[75] Inventor: Jimmie R. Swann, Coahoma, Tex.
[73] Assignee: Cosden Oil & Chemical Company, Big Springs, Tex.
[22] Filed: June 14, 1971
[21] Appl. No.: 152,881

[52] U.S. Cl. ................................................83/433
[51] Int. Cl. ............................................B26d 3/08
[58] Field of Search...................83/428, 368, 433, 83/425, 498, 499

[56] References Cited
UNITED STATES PATENTS

| | | | |
|---|---|---|---|
| 3,543,625 | 12/1970 | Rowland | 83/433 |
| 2,224,070 | 12/1940 | Walter | 83/433 |
| 3,085,459 | 4/1963 | McDermott | 83/433 X |
| 3,664,233 | 5/1972 | Brocklehurst | 83/433 |

*Primary Examiner*—Donald R. Schran
*Attorney*—M. N. Cheairs and Charles D. Tuttle

[57] ABSTRACT

Elongated plastic sheet material is cut longitudinally into strips of uniform, predetermined width by passing the plastic sheet material through a cutting device in the direction of its longitudinal axis wherein at least one blade member extends through the sheet material, thereby severing it longitudinally. The blade or blades are maintained in a fixed position relative to the sheet notwithstanding lateral movement of the sheet by a guide mechanism which engages the longitudinal edges of the sheet and instantaneously moves each blade member to correspond with lateral movement of the sheet.

3 Claims, 5 Drawing Figures

PATENTED MAY 29 1973 3,735,658

INVENTOR:
JIMMIE R. SWANN

Richards, Harris & Hubbard
ATTORNEYS

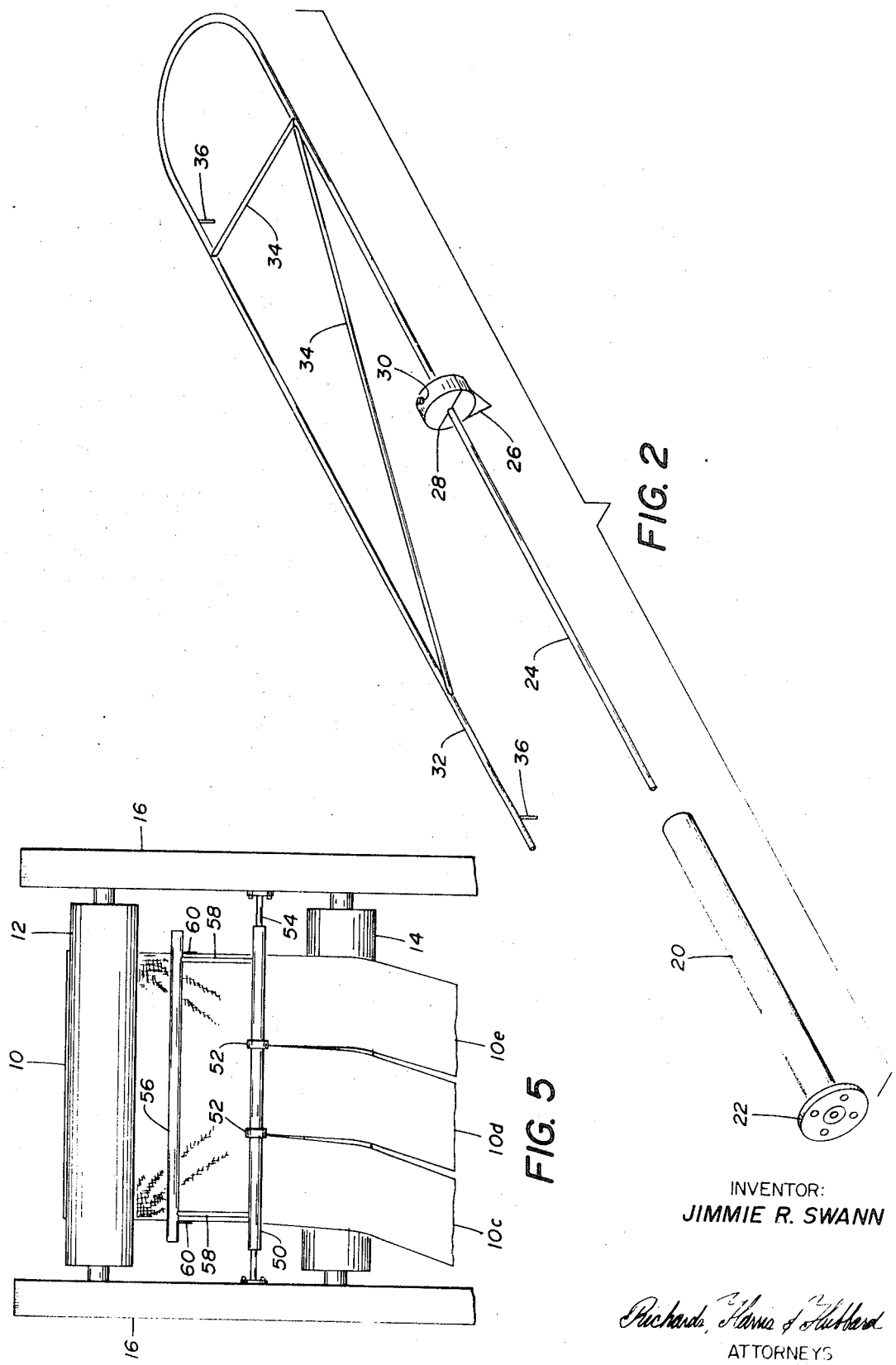

PLASTIC CUTTING APPARATUS

This invention relates to the processing of plastic sheet material. In a specific aspect, this invention relates to a novel means for cutting an elongated plastic sheet longitudinally.

Various mechanisms are known in the art for extruding, cutting, forming and handling plastic sheet material. For example, a conventional method of manufacturing and processing polystyrene foam sheet material is to initially extrude a wide continuous sheet of the polystyrene foam and then pass the sheet through a cutting mechanism between a pair of spaced rollers. The cutting mechanism severs the sheet longitudinally in one or more places, and the resulting strips are wound upon a spool or spools. Thus, the cutting mechanism normally includes one or more knives positioned in a fixed position relative to the moving sheet and is adapted to sever the sheet longitudinally in one or more places as it passes by the knife. Problems have occurred in the operation of such conventional cutting mechanisms when the foam sheet becomes displaced laterally as it moves therethrough, such as by the action of the extruder or the cooperating roller drums or lateral distortion of the plastic sheet. Because of this lateral movement, a precision cutting of the sheet is difficult.

Therefore, one object of this invention is to provide an apparatus for cutting elongated plastic sheet material.

Another object of this invention is to provide a novel apparatus for cutting an elongated sheet as it continuously moves longitudinally with respect to the knife, whereby precision cutting of the sheet can be obtained even though the sheet may move laterally.

In accordance with the invention, elongated plastic sheet material is cut longitudinally as it moves along its longitudinal axis by a knife positioned adjacent the sheet and adapted to sever the sheet longitudinally in response to such movement, and guide members for maintaining the knife at a predetermined position relative to the strip in response to lateral movement of the strip.

This invention can be more easily understood from a study of the drawings in which:

FIG. 2 is an exploded detail view of the cutting apparatus depicted in FIG. 1;

FIG. 5 is a plan view of another embodiment of this invention.

Figure 1:
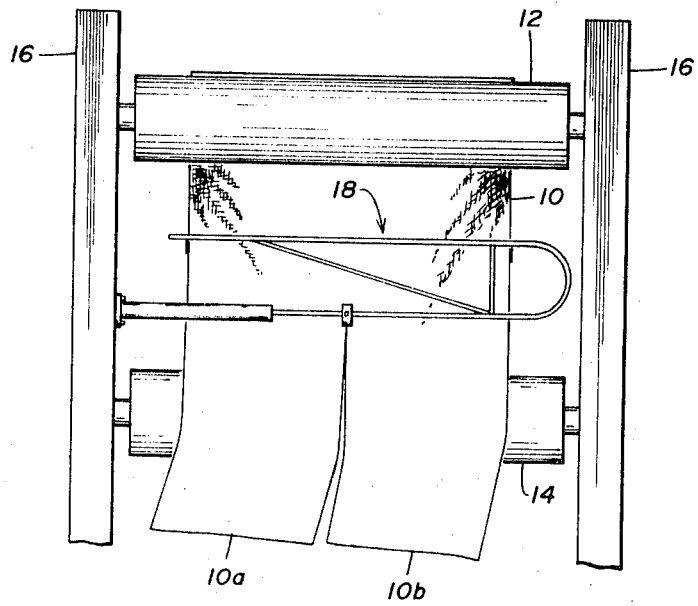
FIG. 1 is a plan view of a preferred cutting apparatus of this invention.

Now referring to the drawings, and particularly to FIG. 1, a preferred embodiment of this invention is shown in operation while severing an elongated plastic sheet 10, such as a continuous plastic sheet of polystyrene foam from an extruder as it passes between rollers 12 and 14 which are mounted between frame members 16. Cutting mechanism 18 functions to sever plastic sheet 10 into strips 10a and 10b, each of a uniform predetermined width, notwithstanding lateral movement of strip 10 on rollers 12 and 14. Cutting mechanism 18 is illustrated in detail in FIG. 2 and comprises a tubular member 20 having a suitable means such as flange 22 at one end thereof which serves as an attachment to a frame member 16. The end of tube 20 opposite flange 22 is adapted to receive knife bar 24 in slidable (telescoping) and rotatable contact. Tubular member 20 carries suitable bearing means therewithin, which will allow knife bar 24 to easily rotate and move longitudinally therewithin.

Knife blade 26 is carried by blade support member 28. Blade support member 28 is shown slidably mounted on knife bar 24 and locked into position by suitable means such as locking screw 30. However, blade support member can be permanently attached to knife bar 24 in an operation wherein it is not desired to alter the width of strips 10a and 10b.

As shown in this embodiment, knife bar 24 terminates in a U-bend to form guide bar 32, which is held a fixed distance from knife bar 24 by support members 34. Guide lugs 36 extend downwardly from guide bar 32 and are spaced apart on guide bar 32 a distance only slightly wider than the width of the plastic sheet material to be cut. It is within the scope of this invention that guide lugs 36 be adjustable on guide bar 32 to accommodate different widths of the plastic sheet material from different size extruder dies and the like.

Figure 3:
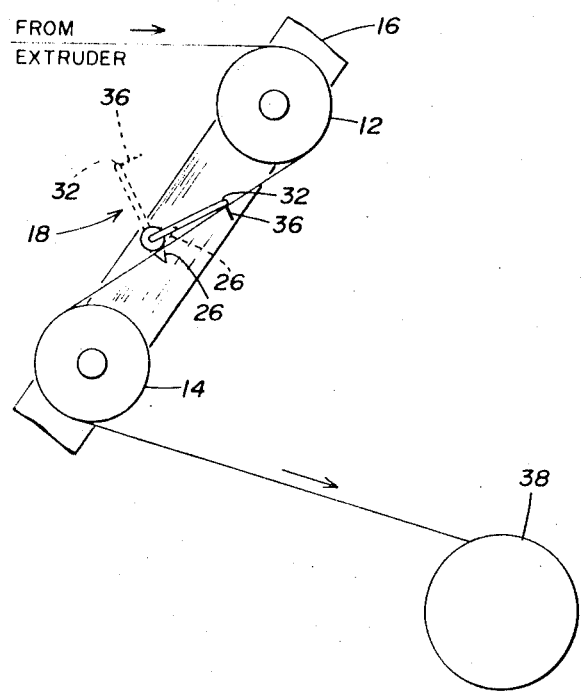
FIG. 3 is a schematic view of the cutting apparatus of FIG. 1.

In the operation of cutting mechanism 18, flange 22 carrying tubular member 20 is attached to a frame member 16 at a point between rollers 12 and 14, and knife bar 24 is inserted therewithin. In this position, knife bar 24 and guide bar 32 can be pivoted within tubular member 20. FIG. 3 illustrates a simple schematic diagram of a typical operation utilizing the cutting device of this invention whereby plastic sheet 10 is formed by an extruder and initially passed around roller 12 to effect a reverse travel thereof and then under roller 14 to storage spool 38. The broken line portion of FIG. 3 shows guide bar 32 rotated upwardly and out of engagement with plastic sheet 10. As can be seen, in this raised position, knife blade 26 will not contact plastic sheet 10 as it passes between rollers 12 and 14. Thus, guide bar 32 of cutting mechanism 18 can be raised to its upper position while the plastic sheet 10 is being positioned on rollers 12 and 14. When it is desired to begin the cutting operation, guide bar 32 is rotated downwardly in a manner such that guide lugs 36 extend on opposite sides of plastic sheet 10 and knife blade 26 penetrates plastic sheet 10. Knife blade 26 continues to sever plastic sheet 10 as the extrusion operation continues, and spool 38 collects strips 10a and 10b as they are formed.

During continuous operation, the plastic sheet 10 frequently moves laterally with respect to rollers 12 and 14 due to the normal forces such as vibrations imparted by the equipment and the like. Any lateral displacement of plastic sheet 10 will be transmitted to guide bar 32 by guide lugs 36 as they engage the edges of plastic sheet 10. This will impart a corresponding lateral movement to knife bar 24, thereby causing knife bar 24 to slide within tubular member 20. Thus, as a consequence of guide lugs 36 responding to the lateral movement of plastic sheet 10, knife blade 26 which is penetrating and cutting plastic sheet 10, is instantaneously moved a corresponding lateral distance with the result that strips 10a and 10b will have uniform width dimensions.

In essence, knife blade 26 will "float" and instantaneously respond to lateral movement of plastic sheet 10, passing over rollers 12 and 14. While it is generally preferred that cutting mechanism 18 "float" on the top of a continuous moving film in accordance with FIGS.

Figure 4:
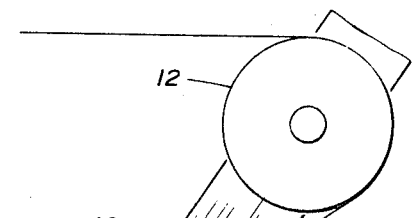
FIG. 4 is a schematic view of an alternate embodiment of the device of FIG. 1.

1 and 3, it is also within the scope of this invention to position cutting mechanism 18 on the underside of plastic sheet 10 such as illustrated in FIG. 4. In this instance, flange 22 of tubular member 10 can be mounted on the opposite frame member 16 than that illustrated in FIG. 1, and then knife bar 24 inserted therewithin such that when it is rotated upwardly, knife blade 26 will penetrate plastic sheet 10. As illustrated, guide bar 32 is held in place against sheet 10 such that guide lugs 36 extend on opposite sides thereof by one or more flexible, resilient members such as spring member 40. Other modifications such as the switching of the position of knife bar 24 and guide bar 32 can also be utilized in the scope of this invention. In addition, when using this invention, a plastic sheet can be cut longitudinally into any desired number of strips by the use of multiple blades carried by corresponding blade support members.

Furthermore, the knife bar can be a tubular member such as knife bar 50, as illustrated in FIG. 5. Knife bar 50 can carry any desired number of knife blades. As shown, for illustrative purposes, knife bar 50 carries two blade support members 52. Each blade support member 52 can be substantially the same configuration as blade support member 30 of FIGS. 1–4. As illustrated, knife bar 50 rests in slidable and rotatable contact on axle 54, which is mounted between frame members 16 at a point between rollers 12 and 14. Guide bar member 56 is extended from knife bar 50 by support arms 58 and carries a pair of guide lugs 60 which extend on either side of plastic sheet 10. Thus, the device as illustrated in FIG. 5 functions in the same manner as the device illustrated in FIGS. 1–4. The operation of the cutting mechanism of FIG. 5 will sever plastic sheet 10 into strips 10c, 10d and 10e, each having a uniform, predetermined width.

While this invention has been described in relation to its preferred embodiments, it is to be understood that various modifications will now be apparent to one skilled in the art upon reading this specification and it is intended to cover such modifications as fall within the scope of the appended claims.

I claim:

1. In a mechanism for cutting an elongated plastic strip which includes roller means to pass said strip through a cutting section in the direction of the longitudinal axis of said strip, and a knife means positioned in said cutting section for severing said strip longitudinally as it pass therethrough, the improvement comprising:
   a. a knife rod carrying said knife means and movable transversely of said strip;
   b. a support section immovably positioned within said cutting section for receiving said knife rod in rotatable and slidable telescoping contact; and
   c. a guide bar connected in spaced relationship to said knife rod and having guide members extending therefrom toward said plastic strip for contacting edge portions of said plastic strip and to thereby move said knife rod carrying said knife means in response to lateral movement of said strip.

2. A device for cutting an elongated plastic strip longitudinally comprising:
   a. a frame for retaining a knife support means adjacent said strip, said knife support means carrying a knife means for severing said strip longitudinally in response to longitudinal movement of said strip;
   b. roller means to pass said strip through said frame and adjacent said knife support means;
   c. knife support means comprising a knife rod carrying said knife means, which is movable transversely of said strip, a support section attached to said frame for receiving said knife rod in rotatable and slidable telescoping contact, and a guide bar connected in spaced relationship to said knife rod and having guide members extending therefrom toward said plastic strip for contacting edge portions of said plastic strip and to thereby move said knife rod carrying said knife means in response to lateral movement of said strip relative to said knife support means.

3. The apparatus of claim 2 wherein said roller means comprises:
   a. a first roller member mounted on said frame and adapted to receive a continuous plastic strip moving along its longitudinal axis and directing said strip adjacent said knife means; and
   b. a second roller member spaced from said first roller member on said frame such that said knife means is positioned therebetween and adapted to receive said strip passing from said first roller member and said knife means.

* * * * *